(12) United States Patent
Goss

(10) Patent No.: US 10,697,499 B2
(45) Date of Patent: Jun. 30, 2020

(54) DRIVE SYSTEM WITH FULL SURFACE DRIVE CONTACT

(71) Applicant: Acument Intellectual Properties, LLC, Sterling Heights, MI (US)

(72) Inventor: David C. Goss, Rockford, IL (US)

(73) Assignee: ACUMENT INTELLECTUAL PROPERTIES, LLC, Sterling Heights, MI (US)

( * ) Notice: Subject to any disclaimer, the term of this patent is extended or adjusted under 35 U.S.C. 154(b) by 425 days.

(21) Appl. No.: 15/072,028

(22) Filed: Mar. 16, 2016

(65) Prior Publication Data

US 2016/0273591 A1 Sep. 22, 2016

Related U.S. Application Data

(60) Provisional application No. 62/135,390, filed on Mar. 19, 2015.

(51) Int. Cl.
| | | |
|---|---|---|
| *F16B 23/00* | (2006.01) | |
| *F16D 1/10* | (2006.01) | |
| *B25B 15/00* | (2006.01) | |
| *B21K 1/46* | (2006.01) | |

(52) U.S. Cl.
CPC .............. *F16D 1/10* (2013.01); *B21K 1/463* (2013.01); *B25B 15/004* (2013.01); *B25B 15/005* (2013.01); *F16B 23/003* (2013.01); *F16D 2001/102* (2013.01)

(58) Field of Classification Search
CPC ........................... F16B 23/0007; F16B 23/003
USPC ........................................................ 411/403
See application file for complete search history.

(56) References Cited

U.S. PATENT DOCUMENTS

| | | | |
|---|---|---|---|
| 2,248,695 A | | 7/1941 | Bradshaw |
| 3,400,626 A | | 9/1968 | Bergere |
| 3,874,258 A | | 4/1975 | Semola et al. |
| 4,006,660 A | | 2/1977 | Yamamoto et al. |
| 4,073,160 A | * | 2/1978 | Perret ................... B25B 13/065 |
| | | | 411/403 |
| 5,137,407 A | * | 8/1992 | Yamamoto ............ F16B 23/003 |
| | | | 411/404 |
| 5,378,101 A | | 1/1995 | Olson et al. |
| 5,577,871 A | | 11/1996 | Brugola |
| 5,957,645 A | | 9/1999 | Stacy |
| 6,079,299 A | * | 6/2000 | Sundstrom .............. B25B 13/04 |
| | | | 81/121.1 |

(Continued)

FOREIGN PATENT DOCUMENTS

| | | |
|---|---|---|
| CN | 1103002 C | 3/2003 |
| DE | 102004026769 A1 | 12/2004 |

(Continued)

OTHER PUBLICATIONS

Tong, Shih-Hsi, and Daniel C.H. Yang; "Involute-Based Screw Driver Profiles With High Load Capacity"; Journal of Mechanical Design, vol. 134, Feb. 17, 2012.

*Primary Examiner* — Flemming Saether
(74) *Attorney, Agent, or Firm* — Clark Hill PLC; James R. Foley

(57) ABSTRACT

A drive system with full surface drive contact. The drive system tends to maximize the surface contact pattern or area at typical bit-recess reaction (drive) torque values, thereby tending to minimize bit-recess surface contact stresses, coating damage, recess ream and premature bit fatigue failure.

8 Claims, 16 Drawing Sheets

(56) References Cited

U.S. PATENT DOCUMENTS

| | | |
|---|---|---|
| 6,186,718 B1 | 2/2001 | Fogard |
| 6,257,851 B1 | 7/2001 | Bush et al. |
| 6,367,358 B1 | 4/2002 | Stacy |
| 7,255,522 B2 | 8/2007 | Dilling |
| 7,891,274 B2 | 2/2011 | Dilling |
| 8,123,524 B2 * | 2/2012 | Anitua Aldecoa ..... A61C 8/005 433/173 |
| 8,740,533 B2 * | 6/2014 | Gaillard ................ F16B 23/003 33/501.45 |
| 9,004,836 B2 | 4/2015 | Wells et al. |
| 9,964,133 B2 | 5/2018 | Bjelobradic et al. |
| 2002/0039523 A1 | 4/2002 | Hartmann et al. |
| 2003/0059233 A1 | 3/2003 | Jang et al. |
| 2004/0149088 A1 | 8/2004 | Yamamoto |
| 2005/0136380 A1 * | 6/2005 | Niznick ................ A61C 8/0018 433/173 |
| 2007/0037123 A1 | 2/2007 | Mansueto et al. |
| 2009/0175702 A1 | 7/2009 | Lin |
| 2010/0129176 A1 | 5/2010 | Karupaya |
| 2011/0116895 A1 | 5/2011 | Garver |
| 2011/0203423 A1 | 8/2011 | Dilling |
| 2012/0099944 A1 | 4/2012 | Kageyama et al. |
| 2012/0137842 A1 * | 6/2012 | Guo ....................... B25B 15/005 81/460 |
| 2012/0255189 A1 | 10/2012 | Gaillard |
| 2013/0068075 A1 | 3/2013 | Stiebitz et al. |
| 2016/0223005 A1 | 8/2016 | Rathmann et al. |
| 2016/0305462 A1 * | 10/2016 | Wunderlich .......... F16B 23/003 |
| 2018/0156257 A1 | 6/2018 | Ruhl et al. |

FOREIGN PATENT DOCUMENTS

| | | |
|---|---|---|
| EP | 1025370 | 8/2000 |
| EP | 1731774 A1 | 12/2006 |
| GB | 893536 A | 4/1962 |
| JP | H03163207 A | 7/1991 |
| RU | 2315209 C2 | 1/2008 |
| RU | 2484231 C1 | 6/2013 |
| WO | 2016149526 | 9/2016 |

* cited by examiner

DRIVE SYSTEM WITH FULL SURFACE DRIVE CONTACT

RELATED APPLICATION (PRIORITY CLAIM)

This application claims the benefit of U.S. Provisional Application Ser. No. 62/135,390, filed Mar. 19, 2015, which is hereby incorporated herein by reference in its entirety.

BACKGROUND

The present invention generally relates to drive systems, such as drive systems involving a bit and a fastener, as well as a punch for forming a recess in the fastener.

Typical fastener drive system designs or geometries result in various surface contact patterns between the drive tool (i.e., bit) and fastener drive feature (i.e., recess). For example, some drive system geometries result in a "point" contact surface pattern, meaning that when the bit is rotated to initial contact with the recess (with near zero reaction torque), it contacts the recess at a point (or a plurality of points around the recess).

Other drive system geometries result in a "line" contact surface pattern, meaning that when the bit is rotated to initial contact, it contacts the recess at a plurality of lines. To place the bit inside of the recess in the fastener, there has to be some sort of gap between the bit and recess. As the bit is rotated, the gap between the bit and recess narrows until there is line contact with the sidewalls of the recess. Both point and line contact systems generate high stresses throughout the drive system and can also add to bit failure.

Still other drive system geometries result in an "area" contact surface pattern from the end of the bit to the top of the recess. Generally, an "area" contact surface pattern is more beneficial than a "line" contact surface pattern, and a "line" contact surface pattern is more beneficial than a "point" contact surface pattern.

However, even with regard to an "area" contact surface pattern, as bit-recess reaction torque (i.e., drive torque) increases, the drive bit geometry is elastically distorted (i.e., twisted and compressed), as well as the recess geometry (i.e., compressed), causing the bit-recess contact surface pattern to change and shift from the end of the bit toward the top of the recess. As the reaction torque increases, the surface contact pattern area tends to decrease, thus further increasing bit-recess contact stresses. The increased contact stresses at the top of the recess may damage the fastener finish (i.e., coating), and may lead to recess failure (ream-out). The increased contact stresses on the bit (and twisting) may cause premature wear, recess failure and fatigue failure.

SUMMARY

An object of an embodiment of the present invention is to provide a drive system with full surface drive contact.

An object of an embodiment of the present invention is to provide a drive system that tends to maximize the surface contact pattern or area at typical bit-recess reaction (drive) torque values, thereby tending to minimize bit-recess surface contact stresses, coating damage, recess ream and premature bit fatigue failure.

Briefly, an embodiment of the present invention provides a drive system which includes a fastener, wherein the fastener comprises drive surfaces which are formed of polygon involutes formed of one or more arcs, or is a single arc construction. With regard to the arcs that define the drive surfaces, preferably each arc has a constant radius (i.e., is a segment of a circle).

Another embodiment of the present invention provides a bit that comprises drive surfaces which are formed of polygon involutes formed of one or more arcs, or is a single arc construction. With regard to the arcs that define the drive surfaces, preferably each arc has a constant radius (i.e., is a segment of a circle).

Another embodiment of the present invention provides a punch that comprises surfaces which are formed of polygon involutes formed of one or more arcs, or is a single arc construction. With regard to the arcs that define the surfaces, preferably each arc has a constant radius (i.e., is a segment of a circle).

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION OF ILLUSTRATED EMBODIMENTS

Figure 1:
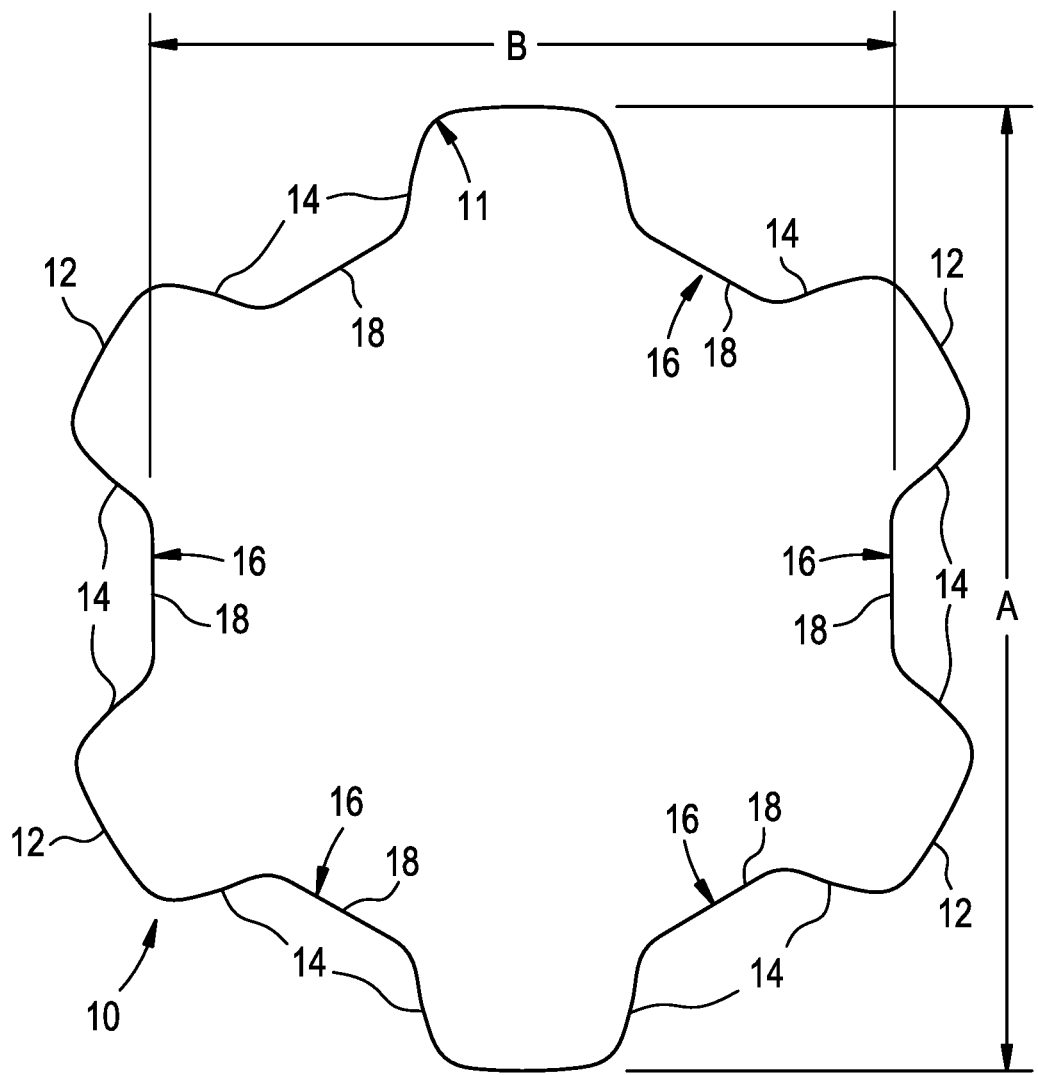
FIG. 1 illustrates a recess (or punch) which in accordance with an embodiment of the present invention.

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

A plurality of embodiments of the present invention is disclosed herein. Each embodiment provides a drive system with full surface drive contact. Specifically, each embodiment includes a fastener, wherein the fastener includes a recess which comprises drive surfaces which are formed of either polygon involutes or is provided as being a single arc construction.

With regard to the term "involute," an involute is the locus of a point, initially on a base circle, which moves so that its straight line distance, along a tangent to the circle, to the tangential point of contact, is equal to the distance along the arc of the circle from the initial point to the instant point of tangency. Alternatively, an involute is the locus of a point on a straight line when the straight line rolls round the circumference of a circle without slipping. The involute is best visualized as the path traced out by the end of, for example, string or a piece of cotton, when the string or cotton is unrolled from its cylindrical reel.

To produce an involute profile, a line is traceable by unwinding, for example, a string from a cylinder. The cylinder can be referred to as the base circle. At any point during this unwinding, the generation line (i.e., the string) is at a tangent with the cylinder and is normal to the involute curve. If two involute profiles were in contact with each other, the generating line would be tangent to both cylinders, which is often called the pressure line.

Mathematically, an involute curve is taken from the following equation:

$$\theta = \beta - \tan^{-1}\sqrt{\frac{R^2 - R_b^2}{R_b}}$$

Wherein R=the radius to any point on the involute; θ=the angle from the start of the involute to radius R; and β=the angle through which the string has to be unwound.

With the generating line length equal to $\sqrt{R^2-R_b^2}$ and also the length of the circumference of the base circle subtended by the angle β such that $$\sqrt{R^2 - R_b^2} = R_b\beta \text{ or } \beta = \frac{\sqrt{R^2 - R_b^2}}{R_b}$$

And through substitution $$\theta = \frac{\sqrt{R^2 - R_b^2}}{R_b} - \tan^{-1}\frac{\sqrt{R^2 - R_b^2}}{R_b}$$

This allows the plotting of the involute curve in polar coordinates (R, θ).

It is common to write the angle as a function of the pressure angle (θ) in the form θ=tan φ-φ=*Inv* φ

Where Inv φ is the Involute function, whose value is tabulated in many books for different gears. This can then be used in many calculations such as the determination of tooth thickness ($T_1$) at different radii, using the equations below.

$$\cos\varphi_2 = \frac{r_1\cos\varphi_1}{r_2}$$

$$T_2 = 2r_2\left[\frac{T_1}{2r_1} + Inv\varphi_1 - Inv\varphi_2\right]$$

It should be pointed out that a fastener, bit, punch, etc. comprising the present invention may have drive surfaces which are not perfect polygon involutes under a microscope, given real life manufacturing processes and materials.

FIG. 1 illustrates a recess 10, such as a recess in a fastener 11 or other structure (FIG. 1 may also illustrate the end surface profile of a punch 10), where the recess 10 is in accordance with a preferred embodiment of the present invention. Specifically, the recess 10 is configured to provide a plurality of lobes 12, each having drive surfaces 14 which are formed of polygon involutes. In the preferred embodiment, each drive surface is formed of a polygon involute comprised of two arcs, wherein each arc has a different radius, but each arc has a constant radius (i.e., each arc is a segment of a circle). Between each lobe 12 is a flute 16 which provides a wall 18 which extends between adjoining lobes 12. These walls 18, and the different shapes they may take, will be described in more detail later hereinbelow.

Figure 2:
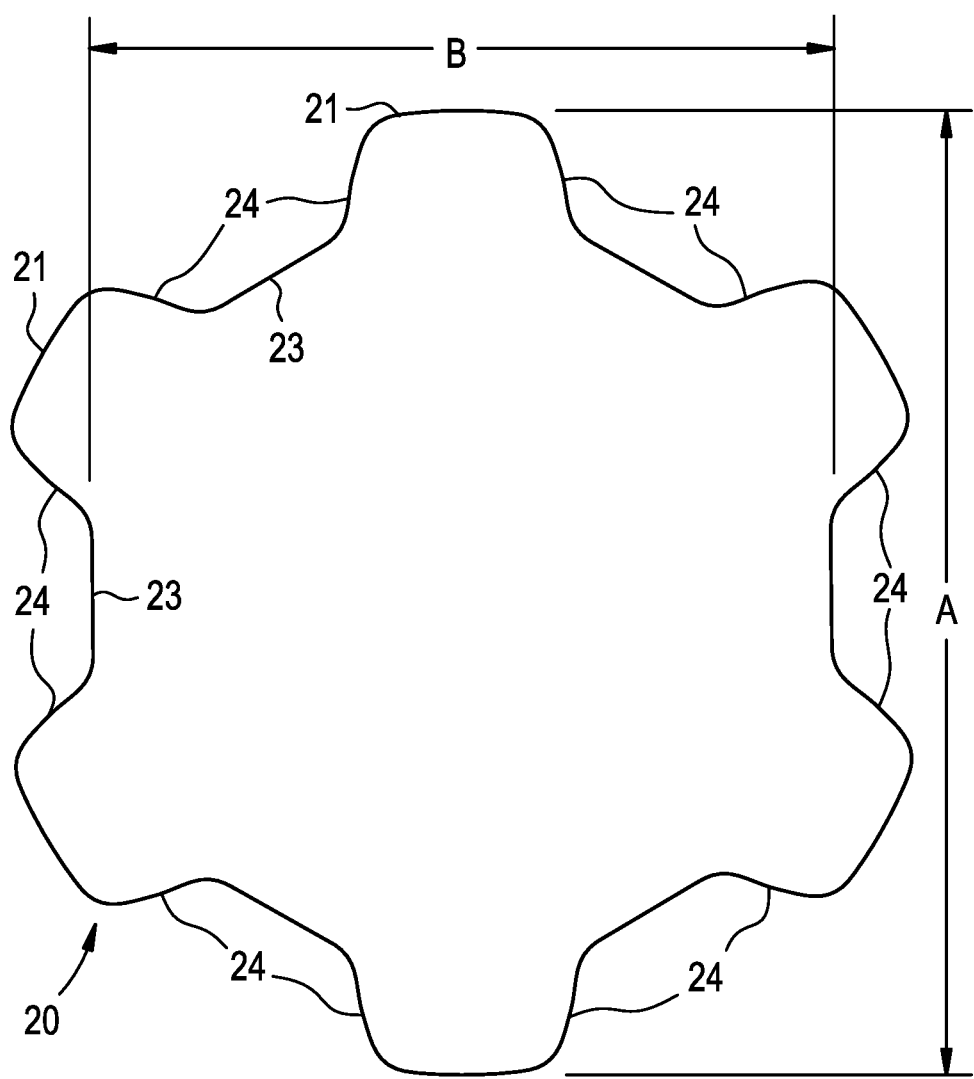
FIG. 2 is a cross-sectional view of a bit which corresponds to the recess shown in FIG. 1.

FIG. 2 provides a cross-sectional view of a corresponding external drive such as a bit 20, where the bit 20 is provided in association with the recess 10 shown in FIG. 1, and where the bit 20 is in accordance with a preferred embodiment of the present invention. Specifically, the profile of the external surface of the bit 20 corresponds to the profile of the recess 10 shown in FIG. 1, such that the bit 20 is insertable in the recess 10, and is rotatable in either a clockwise or counter clockwise direction in order to drive the fastener in which the recess 10 is formed.

The bit 20 corresponds to the recess 10. As such, the bit 20 comprises a plurality of lobes 21, each lobe 21 comprising drive surfaces or drive walls 24 which are formed of polygon involutes. More specifically, preferably the drive surfaces 24 are formed of polygon involutes comprised of two arcs, and each arc has a constant radius (i.e., is a segment of a circle). Preferably, each of the walls 23 between the flutes 21 is at least one of flat, concave circular. convex vertex and concave vertex, as will be described more fully hereinbelow.

Figure 3:
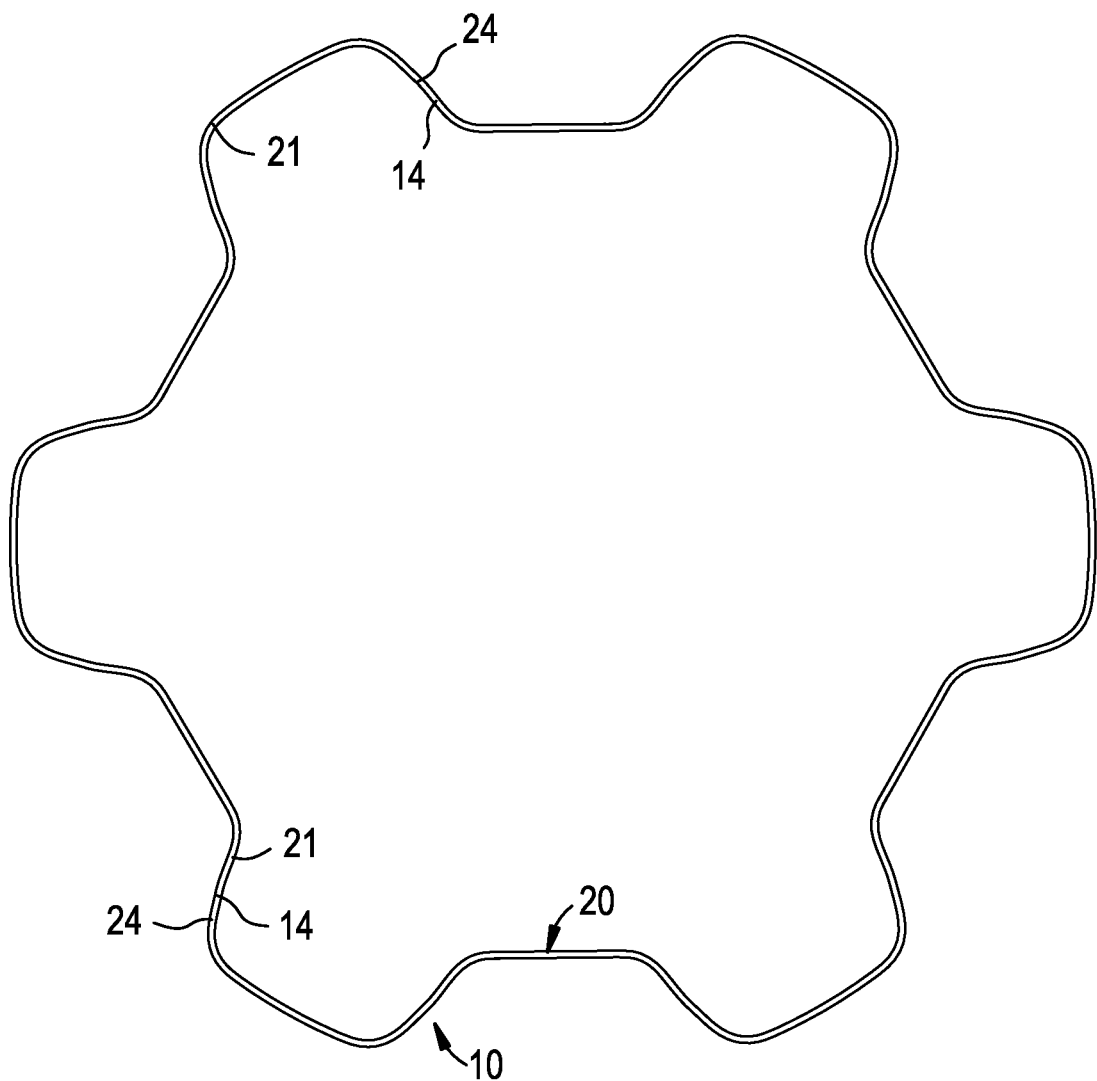
FIG. 3 shows the bit of FIG. 2 inserted in the recess of FIG. 1.
Figure 4:
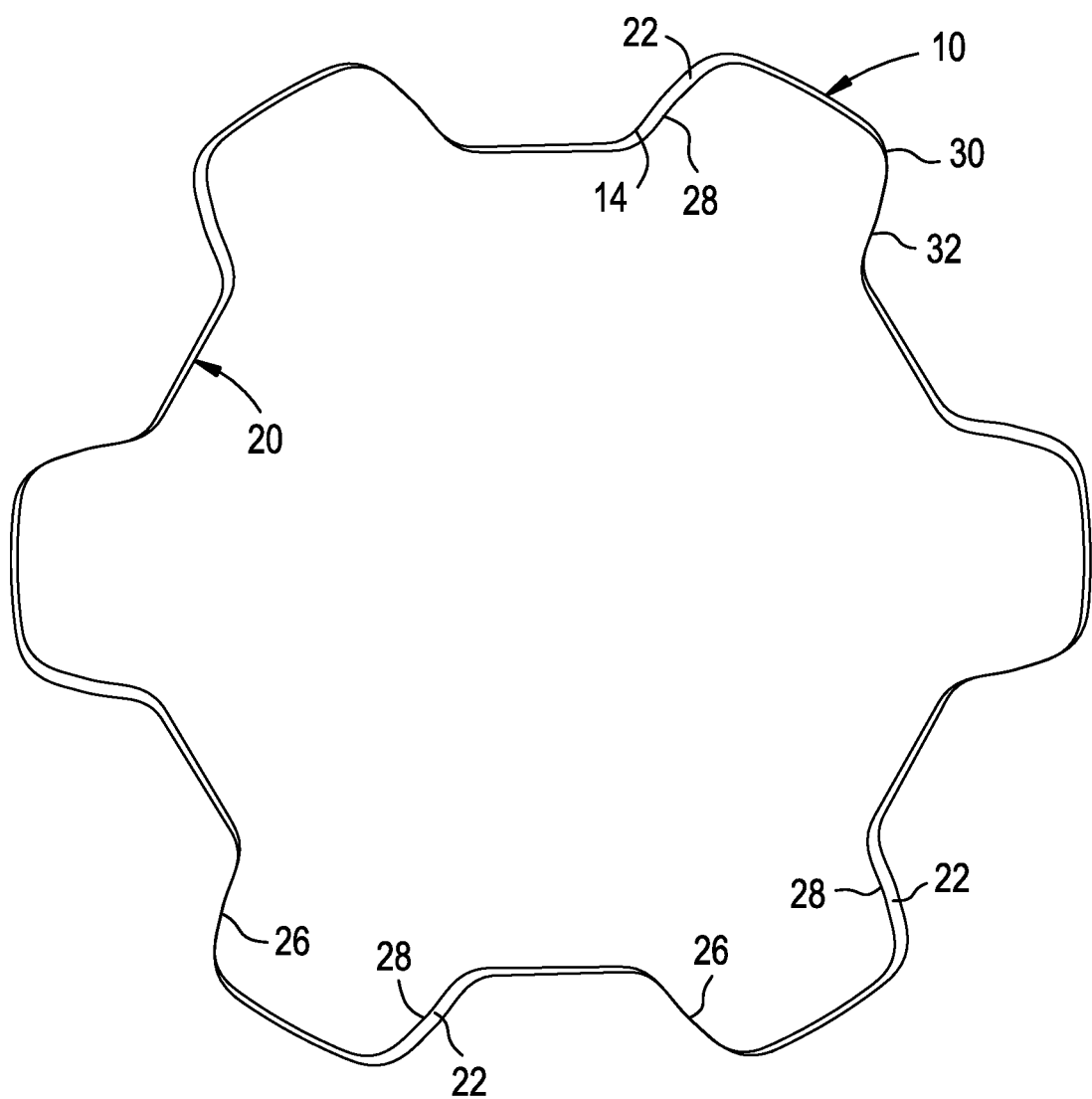
FIG. 4 is similar to FIG. 3, but shows the bit and recess after the bit has been rotated into full surface contact with driving walls of the recess

When the bit 20 is initially inserted in the recess 10, the bit 20 and recess 10 may appear as shown in FIG. 3, wherein there are gaps 21 between drive walls 24 of the bit 20 and the drive walls 14 of the recess 10. Assuming the bit 20 is then rotated clockwise, the bit 20 and recess 10 may appear as shown in FIG. 4, wherein leading walls 26 of the bit 20 engage corresponding drive walls 14 of the recess 10, while trailing walls 28 of the bit 20 are spaced away from corresponding drive walls 14 of the recess 10 to provide gaps 22.

Figure 5:
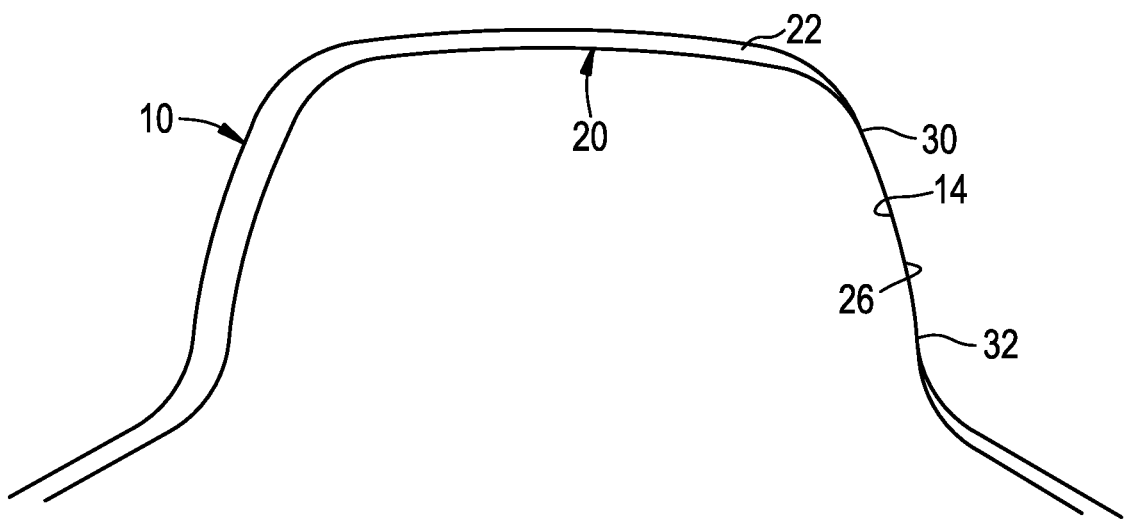
FIG. 5 is an enlarged view which clearly shows the full surface contact.
Figure 6:
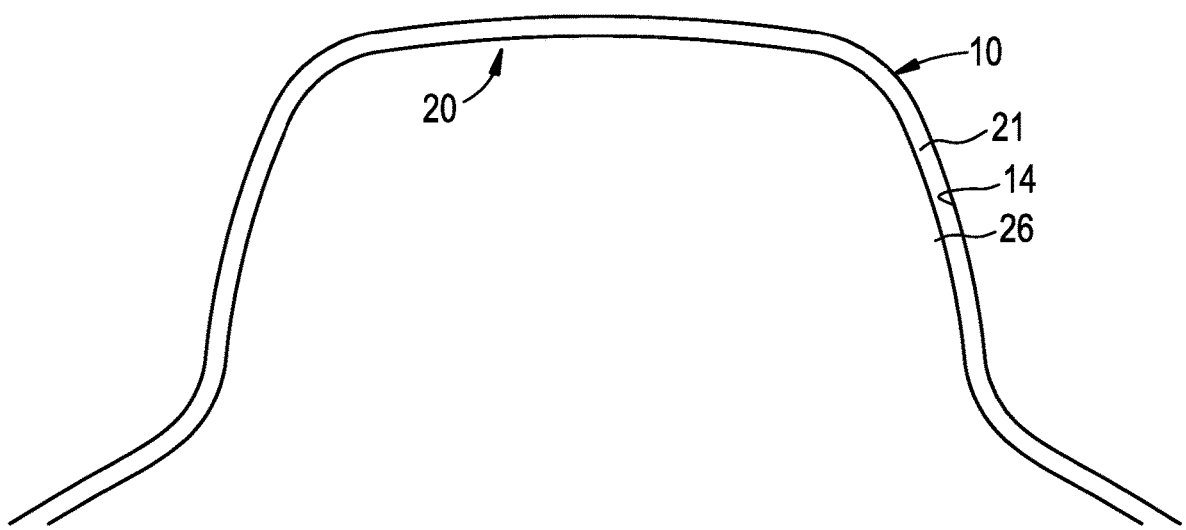
FIG. 6 is an enlarged view which shows a gap between the bit and the recess before the bit is rotated.

The full surface contact between the leading walls 26 of the bit 20 and the corresponding drive walls 14 of the recess 10 can best be seen in FIG. 5, which provides an enlarged view of the interface between one of the leading walls 26 of the bit 20 and one of the drive walls 14 of the recess 10. The full surface contact extends from point 30 to point 32. On the other hand, the gap 21 between the leading walls 26 of the bit 20 and the corresponding drive walls 14 of the recess 10 before the bit 20 is rotated can best be seen in FIG. 6, which provides an enlarged view of one of the leading walls 26 of the bit 20 and the corresponding drive wall 14 of the recess 10. As shown in FIG. 4, but for the surface contact between points 30 and 32, the gap 22 between the bit 20 and the recess 10 is constant, and preferably remains constant while the bit 20 rotates.

While other configurations are disclosed herein, the two arc polygon involute configuration shown in FIGS. 1 and 2 is preferred. With this configuration, the blend radius (i.e., the section between each of the arcs) does not get washed away. Additionally, a minimal gap 22 is provided between the bit and recess. While each arc preferably has a different radius, each arc preferably has a constant radius (i.e., each arc is a segment of a circle). The A and B dimensions shown in FIG. 1 are diameters. Having these diameters aids in the measurement of this feature, provides more lobular width in the A dimension, reduces the chance of chipping of the heading tool, and increases the bit area at the lobes.

Figure 7:
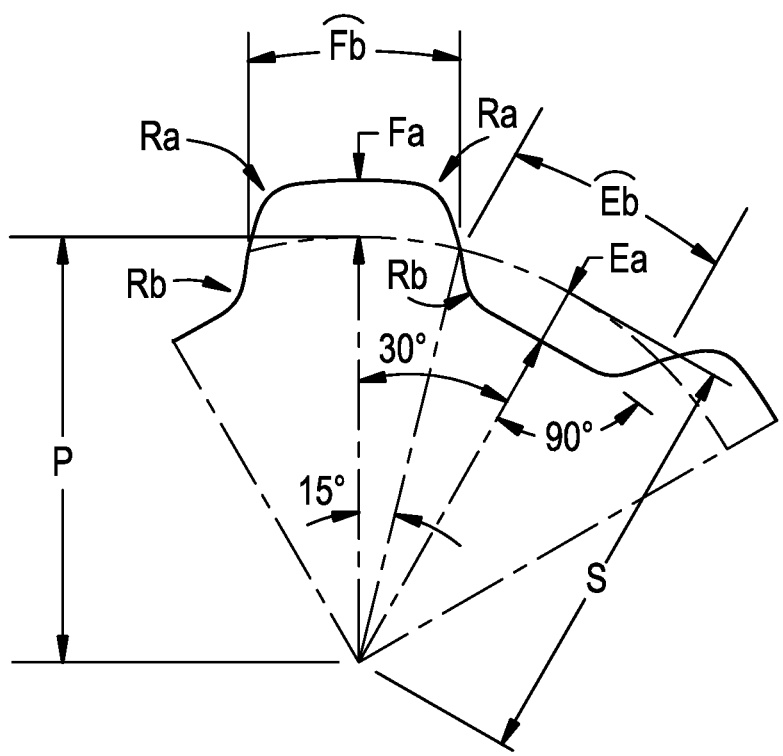
FIGS. 7 and 8 show portions of the recess shown in FIG. 1, but also indicate some dimensions thereof.
Figure 8:
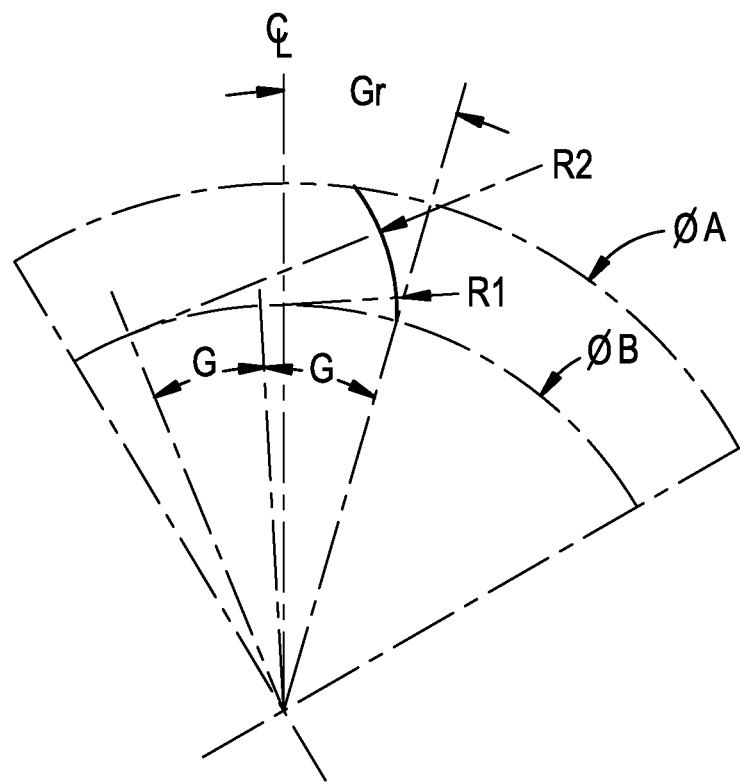

FIG. 7 shows a portion of the recess shown in FIG. 1, and indicates some of the dimensions. FIG. 8 shows just one of the driving walls of the recess, and indicates some other dimensions, including the radius (R1 and R2) of each of the two arcs. As shown, while R1 does not equal R2, each one of R1 and R2 is constant. With regard to the actual values of each of the dimensions, one specific embodiment may provide that, for example (all values being in inches), R1=0.0198752778, R2=0.0397505556, A=0.155, B=0.1206, Fa=0.0086, Fb=0.0360759556, Ea=0.0086, Eb=0.0360759556, P=0.0689, S=0.0689, Ra=0.007 and Rb=0.005. With regard to Gr and G, Gr may be 17.9021442092 degrees and G (REF) may be 18.9716157232 degrees. This is just one embodiment of the present invention, and plenty other sizes, shapes, etc. are entirely possible while still staying within the scope of the present invention.

Figure 9:
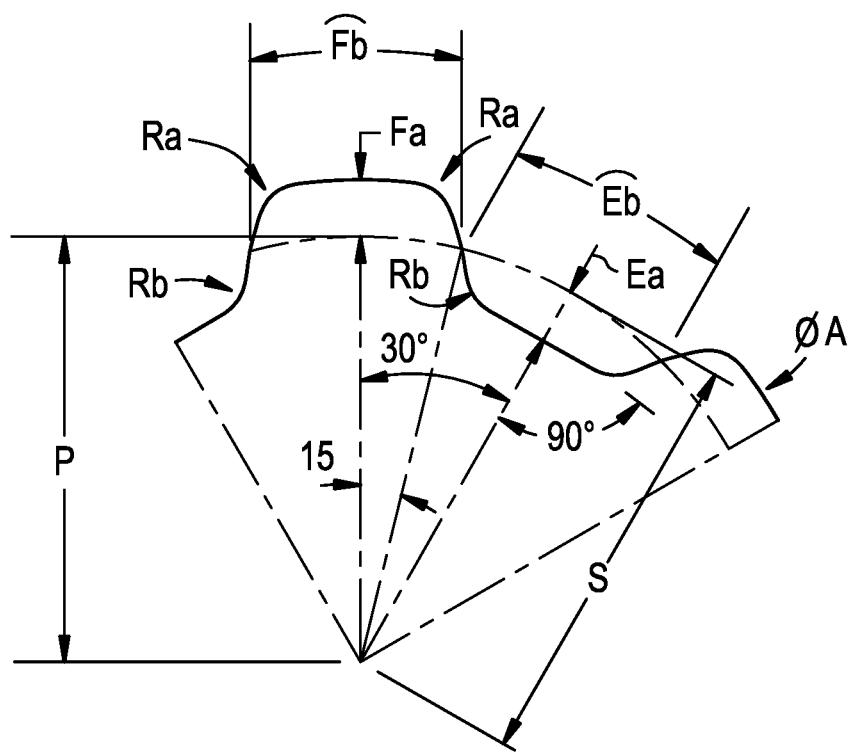
FIGS. 9 and 10 show portions of the bit shown in FIG. 2, but also indicate some dimensions thereof.
Figure 10:
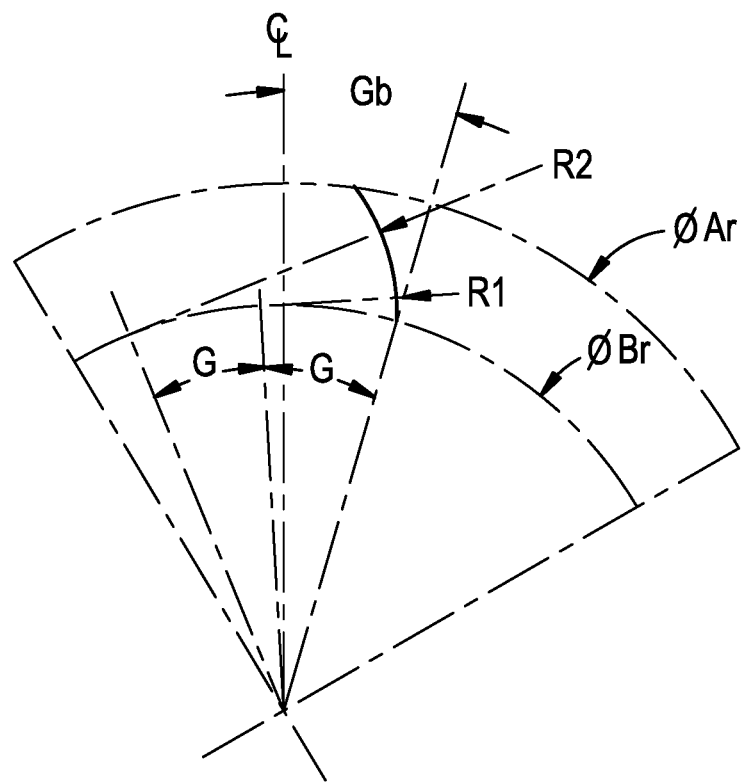
Figure 11:
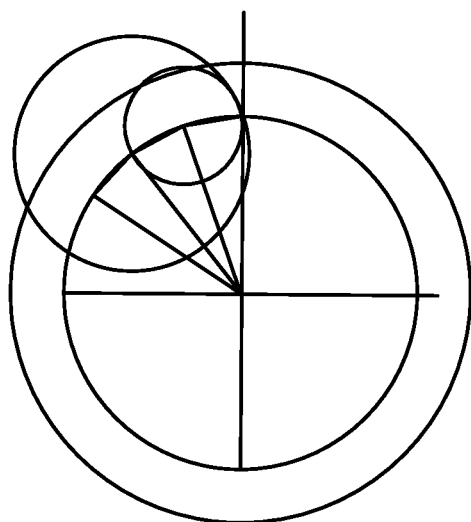
FIGS. 11-13 provide views relating to the recess shown in FIG. 1.
Figure 12:
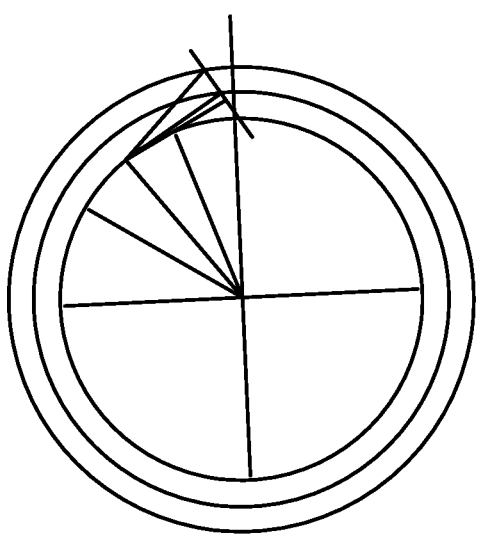
Figure 13:
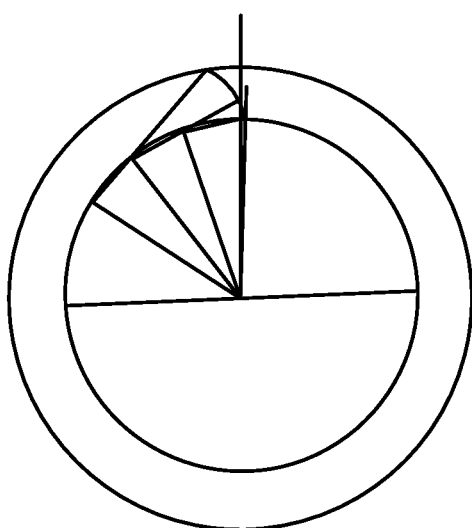

FIGS. 9 and 10 are similar to FIGS. 7 and 8, but relate to the bit 20 shown in FIG. 2. As shown, the bit has a shape which corresponds to the recess. FIGS. 11-13 provide a plurality of views relating to the two arc configuration and are self-explanatory.

Figure 14:
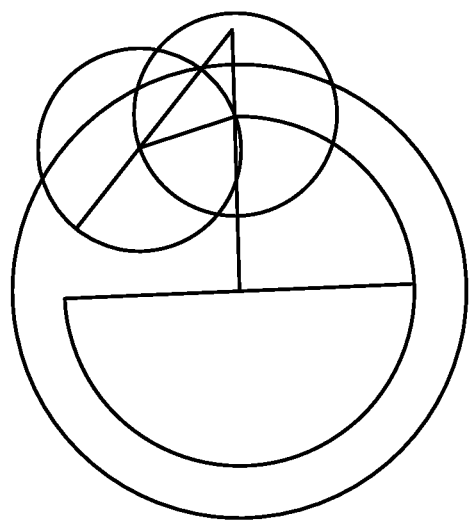
FIGS. 14-21 provide views relating to alternative embodiments.
Figure 15:
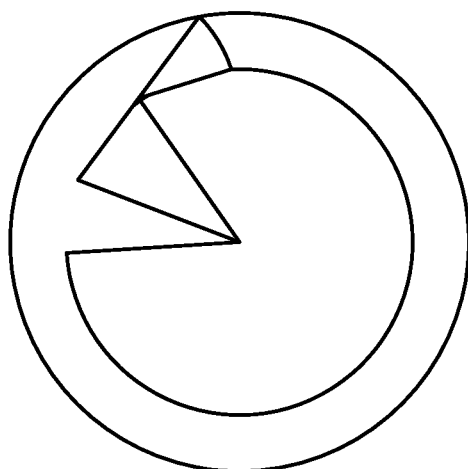
Figure 16:
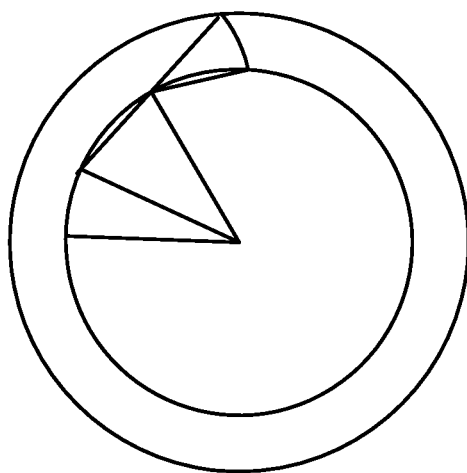

FIGS. 14-16 provide a plurality of views relating to an alternative embodiment and are also self-explanatory. Specifically, FIG. 14-16 show a configuration where each of the drive walls of the recess is provided as being formed of a polygon involute comprising one arc, said arc having a constant radius (i.e., it is a segment of a circle).

Figure 17:
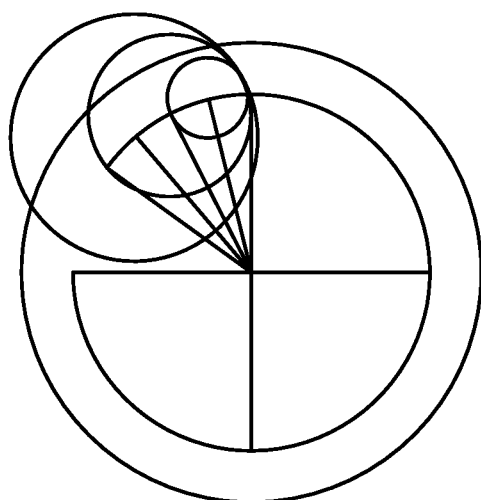
Figure 18:
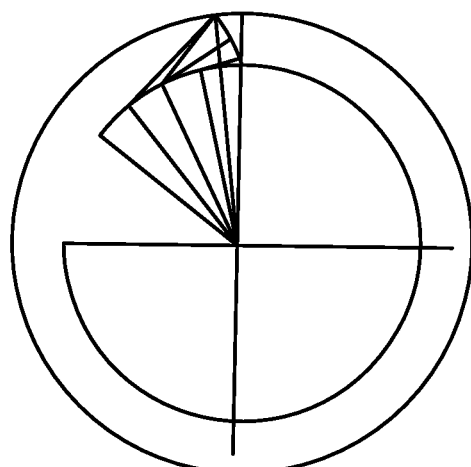
Figure 19:
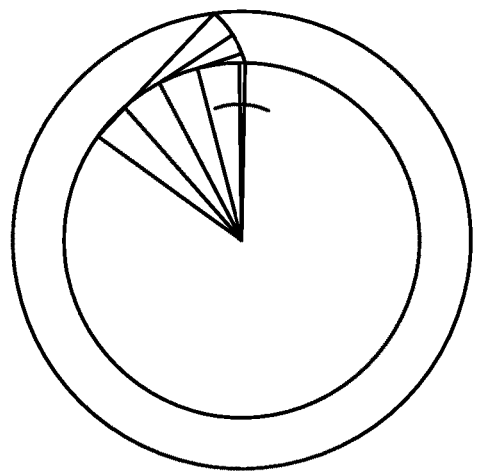

FIGS. 17-19 provide a plurality of views relating to yet another embodiment and are self-explanatory. Specifically, FIG. 17-19 show a configuration where each of the drive walls of the recess is provided as being formed of a polygon involute comprising three arcs, wherein each arc has a different radius, but each arc has a constant radius (i.e., each arc is a segment of a circle).

Figure 20:
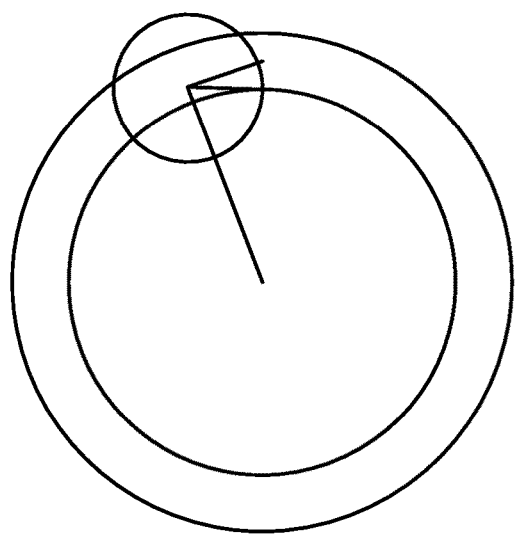
Figure 21:
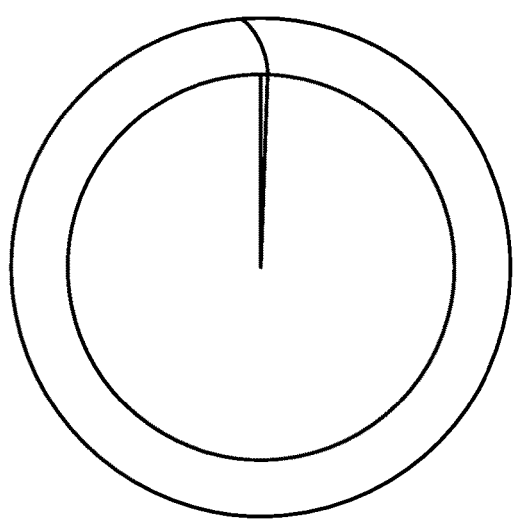

FIGS. 20-21 provide a plurality of views relating to a still further embodiment and are self-explanatory. Specifically, FIG. 20-21 show a configuration where each of the drive walls of the recess are provided as being of a single arc construction, wherein the radius of the arc is constant (i.e., the arc is a segment of a circle).

Figure 22:
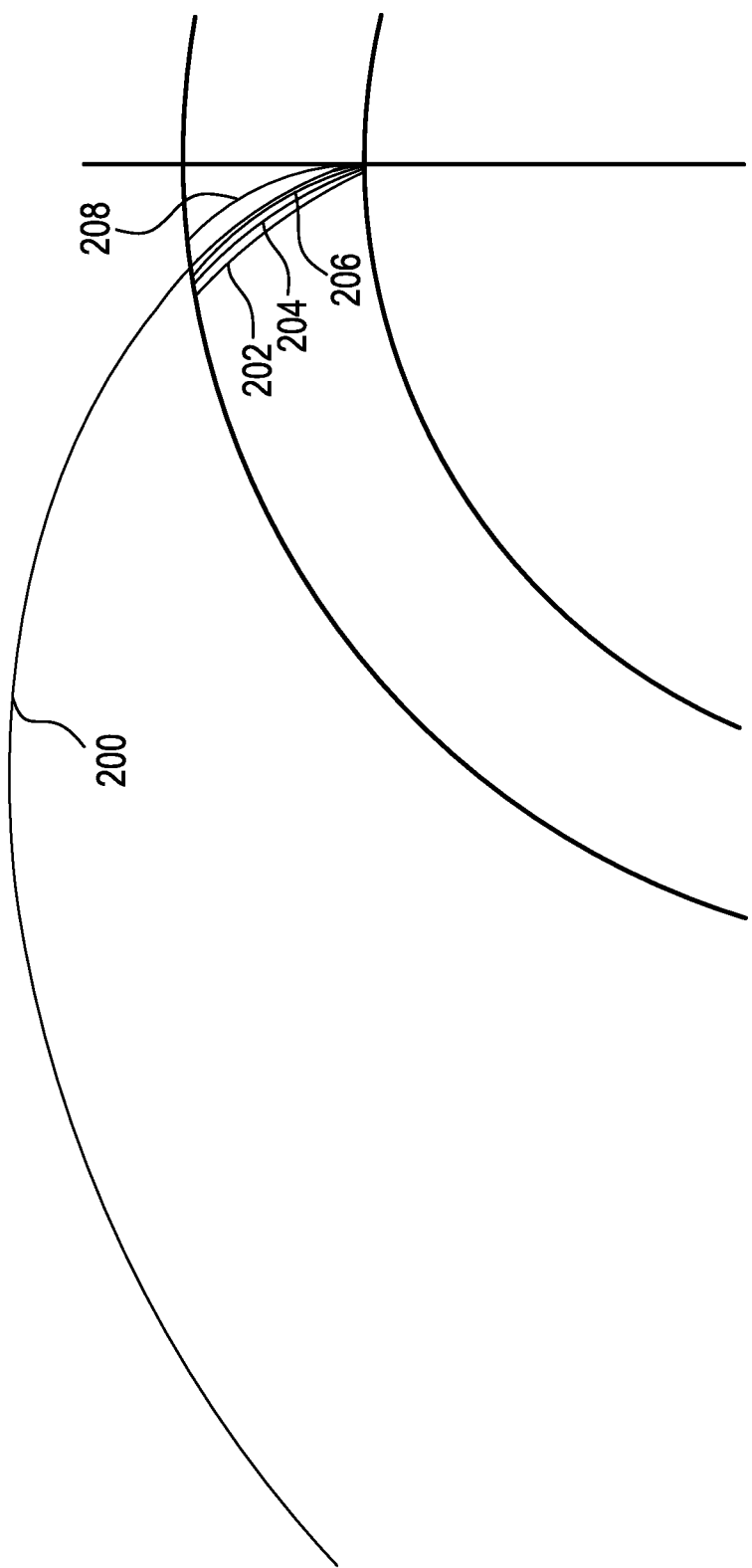
FIG. 22 is a view which compares the embodiments.

FIG. 22 is a view which compares the different embodiments. Reference numeral 200 identifies circle involute-high precision, reference numeral 202 identifies a polygon involute-1 arc, reference numeral 204 identifies a polygon involute-2 arcs, reference numeral 206 identifies a polygon involute-3 arcs, and reference numeral 208 identifies a one arc construction (perpendicular arc).

Figure 23:
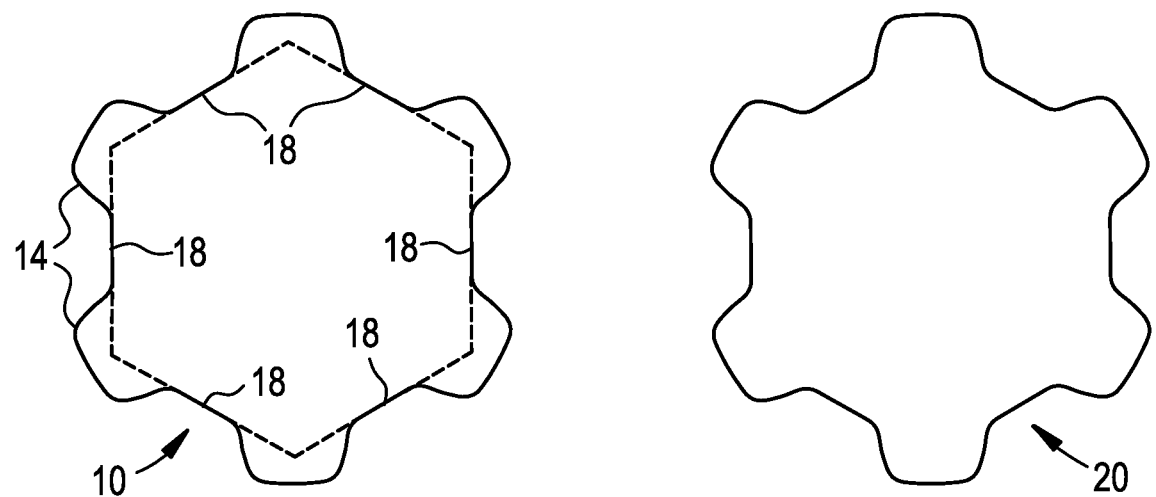
FIGS. 23-27 illustrate different versions of extending walls provided between lobes of the recess.
Figure 24:
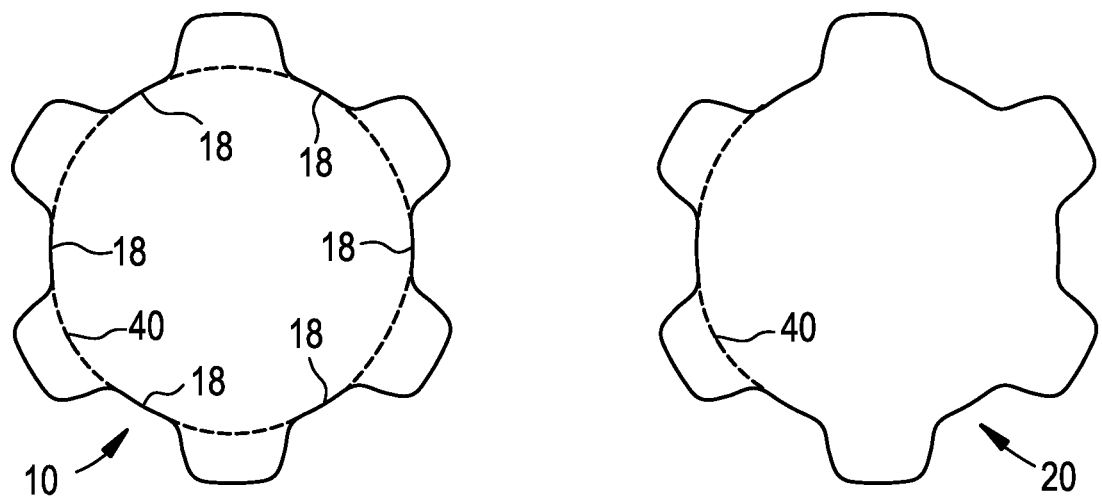

FIGS. 1 and 2 illustrate a configuration wherein walls 18 between the lobes 12 are provided as being flat. This is shown very well in FIG. 23, which shows the recess 10 on the left, the bit 20 on the right. This is a preferred configuration with regard to walls 18 because it provides that the walls 18, collectively define a hexagon shape, thus a hex tool can be inserted in the recess and used to drive the fastener (in addition to the corresponding bit shown on the right in FIG. 23).

Each of FIGS. 24-27 shows an alternative embodiment, and in each case the recess is shown on the left, and the corresponding bit (similarly shaped) is shown on the right. In the embodiment shown in FIG. 24, each of the walls 18 between the flutes is semi-circular (i.e., convex circular) and identifies the circle with reference numeral 40.

Figure 25:
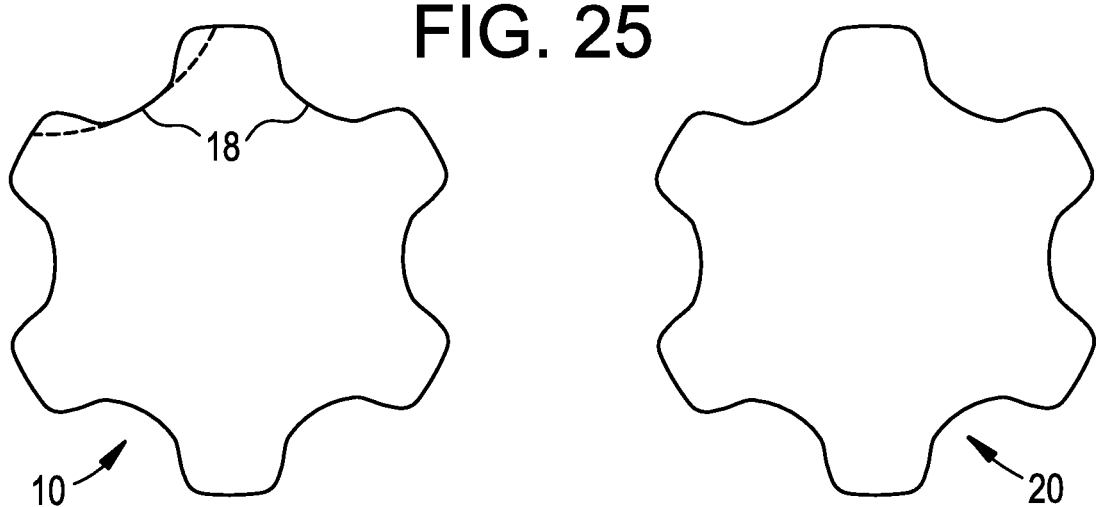
Figure 26:
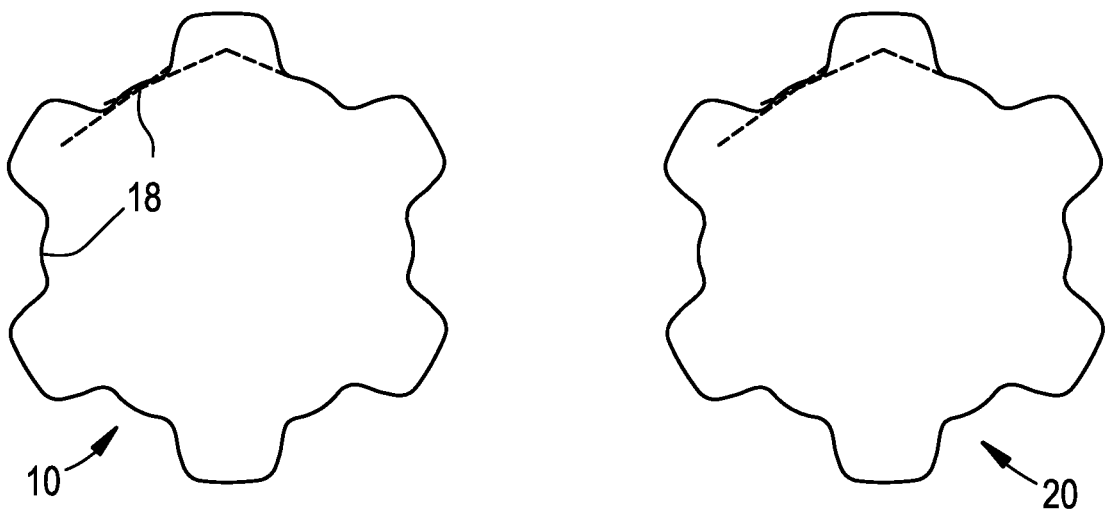
Figure 27:
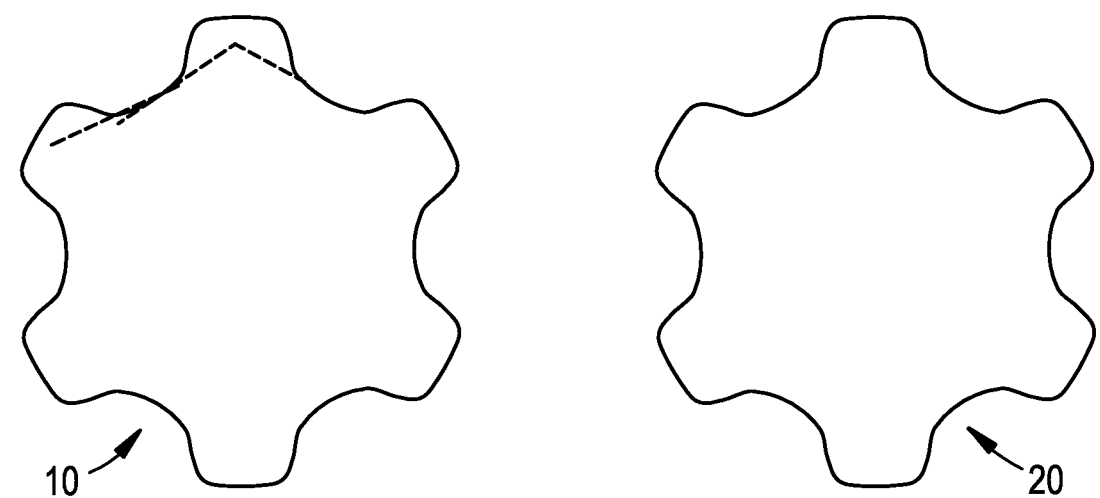

In the embodiment shown in FIG. 25, each of the walls 18 between the lobes 14 is concave circular. In the embodiment shown in FIG. 26, each of the walls 18 between the lobes 14 is a convex vertex. In the embodiment shown in FIG. 27, each of the walls 18 between the lobes 14 is a concave vertex.

Although the depths of none of the recesses disclosed herein has been specifically shown or described, the depth of any of the recesses can take any appropriate form, depending on the application, and the desired properties of the drive system. For example, the depth can be flat (for example, the depth at the bottom of the recess can be flat), conical, have a spherical bottom, etc. For example, the depth may be such that each of the driving walls is semi-cylindrical with regard to going down into the recess.

With regard to the bit provided to engage any of the recesses disclosed herein, preferably the bit is provided as being slightly helical (i.e., pre-twisted). This way the use of an area contact pattern recess geometry is combined with a corresponding slightly helical bit geometry. Consequently, at near zero reaction torque, the end of the bit first contacts the recess and, as the torque increases, the bit-recess surface contact pattern area expands and extends from the end of the bit to the top of the recess.

While embodiments of the present invention have been described as being implemented in the form of a recess in the head of a fastener, embodiments may take the form of the external drives (such as bits) having external profiles which are consistent with the recesses which have been described. In fact, the drawings provided herein would even apply to such embodiments as well. Additionally, while the drawings show a six lobe system, the present invention can be implemented with regard to systems involving either more or fewer lobes, such as three, four or five lobe systems.

While specific embodiments of the invention have been shown and described, it is envisioned that those skilled in the art may devise various modifications without departing from the spirit and scope of the present invention.

What is claimed is:

1. A fastener comprising a recess having a center; a drive surface in the recess, said drive surface extending from an inner to an outer diameter formed of polygon involutes comprising a plurality of continuous tangent arcs, wherein each arc has a radius within the recess wherein the arcs are concave relative to the center of the recess, where each radius is constant but different, and wherein each radius has a center located on locus points of a radius at the center of the recess.

2. A fastener as recited in claim 1, wherein the recess is configured to provide a plurality of lobes, said lobes comprising drive surfaces which are formed of said polygon involutes.

3. A fastener as recited in claim 1, wherein the recess is configured to provide a plurality of lobes, said lobes comprising drive surfaces which are formed of said polygon involutes.

4. A fastener as recited in claim 3, wherein each arc is a segment of a circle.

5. A fastener as recited in claim 3, further comprising a wall between each lobe, said wall being flat.

6. A fastener as recited in claim 3, further comprising a wall between each lobe, said wall being concave circular.

7. A fastener as recited in claim 3, further comprising a wall between each lobe, said wall being a convex vertex.

8. A fastener as recited in claim 3, further comprising a wall between each lobe, said wall being a concave vertex.

\* \* \* \* \*